United States Patent [19]

Kunze

[11] Patent Number: 4,511,333
[45] Date of Patent: Apr. 16, 1985

[54] DEVICE FOR BURNING CEMENT

[75] Inventor: Oswald Kunze, Rösrath, Fed. Rep. of Germany

[73] Assignee: Klöckner-Humboldt-Deutz AG, Fed. Rep. of Germany

[21] Appl. No.: 450,347

[22] Filed: Dec. 16, 1982

[30] Foreign Application Priority Data

Dec. 21, 1981 [DE] Fed. Rep. of Germany ....... 3150501

[51] Int. Cl.³ ............................ F27B 7/02; C04B 7/02
[52] U.S. Cl. ..................................... 432/106; 106/100
[58] Field of Search .................. 432/14, 106; 106/100

[56] References Cited

U.S. PATENT DOCUMENTS

| 1,468,168 | 9/1923 | Pike | 432/106 |
| 3,891,383 | 6/1975 | Kobayashi | 432/106 |
| 4,179,265 | 12/1979 | Gildersleeve | 432/106 |
| 4,248,639 | 2/1981 | Quittkat | 106/100 |
| 4,369,067 | 1/1983 | Enkegaard | 432/14 |

Primary Examiner—John J. Camby
Attorney, Agent, or Firm—Hill, Van Santen, Steadman & Simpson

[57] ABSTRACT

A mechanism and method for calcining cement including a precalciner and a rotary tubular kiln receiving material therefrom and discharging through a vertical conduit to a cooler, means for delivering air through the cooler to flow up through the conduit to the kiln with a laterally movable plate type valve controllably positioned in the shaft to increase the resistance to gas flow from the cooler to the kiln and a branch conduit for receiving excess air from the cooler as tertiary air and delivering the air to the precalciner with means for separating a dust from the tertiary air.

3 Claims, 2 Drawing Figures

DEVICE FOR BURNING CEMENT

BACKGROUND OF THE INVENTION

The invention relates to improvements in mechanisms and methods for calcining cement including a precalciner, a calcining kiln, cooler and a burner and gas flow control means. More particularly, the invention relates to an improved cement calcining construction including a suspension type heat exchanger with a calciner, a rotary tubular kiln and a cooler connected thereto with a conduit for the discharge of material from the kiln to the cooler and a tertiary air conduit for supplying air to the precalciner.

For convenience of the description of the method and mechanism, the terms "primary air", "secondary air" and "tertiary air" will be used herein, and these terms will be defined inasmuch as they are not universally employed in the same manner in literature referring to cement calcining structures. What is meant by "primary air" is the air which is supplied to a burner which is usually the principal burner of the rotary tubular kiln for processing the air fuel mixture, and the air is usually supplied as atomizer air to the burner.

What is meant by "secondary air" is the combustion air delivered to the rotary tubular kiln which is required by the burner flame cone for complete combustion.

What is meant by "tertiary air" is that combustion air which is required in the precalcining operation for the predominantly flameless precalcination deacidification process of the ground rock which is being processed into cement.

The primary air is prepared and delivered by a compressor or blower having an atmospheric air intake, or the primary air may be obtained from a preheating aggregate. The primary air is compressed and supplied to the burner of the rotary tubular kiln as processing air. The secondary air is usually introduced from coolers into the rotary tubular kiln which utilizes the secondary air for the firing or calcinination.

The tertiary air is supplied by a tertiary air conduit which bridges the rotary tubular kiln and is connected to receive air from the cooler and is supplied to the precalcining zone or to the precalciner where it is mixed with fuel and is delivered in suspension with the ground rock to be deacidified and heated to approximately 700° through 800° C., and supplies the thermal energy necessary for the endothermic deacidification process.

A device for calcining cement of the type above referred to is shown in the German OS No. 2,360,580. Therein, the tertiary air conduit is referred to as "secondary air conduit", shown at 82 in accord with the above definition. It is stated on page 5, paragraph 2 of the German OS that the air velocity in the secondary air conduit 82 is higher than the gas velocity in the rotary tubular kiln for economy reasons. In this known device, a dust collector is shown at 81 and is built into the secondary air conduit 82, and for this reason, this structure exhibits a considerably higher resistance than the flow system of the secondary air including the flame gases in the rotary tubular kiln. Consequently, the kiln and gas flow system is equipped with a constricted opening shown at 83 in order to achieve a matching of the resistances in the two flow systems. However, a blower which produces the matching of the resistance can be provided in the secondary air conduit 82 instead of the constricted opening 83.

The latter solution, however, as expressly stated, does not represent an expedient method due to a short useful life because air at high temperature and mixed with clinker dust is conveyed.

Another known device of the same species wherein a throttle device is also disposed in the flue gas channel between the intake of the rotary tubular kiln and the lowest cyclone of the suspension type heat exchanger or precalciner is disclosed in German OS No. 2,325,468. In this structure, it is a matter of utilizing a pivotal throttle valve.

In the known arrangements wherein the throttle location or a throttle member is used in the area of the kiln intake in order to balance the air flow, or respectively, the resistances of the flow systems of the rotary kiln and the tertiary air conduit introduce a series of disadvantages.

Because the temperature level is very high, particularly in a short rotary tubular kiln, for example between 1,000° and 1,200° C., the incorporation of movable throttle members is difficult and the useful life is unsatisfactory.

Further, vortex flow patterns occur at the throttle location producing injurious dust circulations and end in the result that the kiln output and heat consumption deteriorate noticeably.

Further, incrustations which may progress to such a degree that a shut-down of operations is forced, are formed under the influence of the disturbed flow given corresponding temperature levels and given materials which tend to soften.

It is an object of the present invention to achieve a flow equalization between secondary air and tertiary air without the kiln operation being disadvantageously influenced due to the formation of disturbed flow zones in the area of the kiln intake, and in particular while avoiding incorporation of throttle elements in this area. Further, an object is obtained of a sensitive, very precise control of the flow system.

The objects of the invention are achieved in that with a given device for burning cement of the type above referred to which comprises a suspension type heat exchanger with a precalciner, a rotary tubular kiln and a cooler connected thereto by means of a vertical conduit, as well as including tertiary conduit means bridging the rotary tubular kiln, a device for increasing the resistance of the gas flow is disposed in the conduit. This flow resistant device can either be provided as a matter of a fixed throttle element, such as a constriction of cross-section as well as an adjustable throttle member such as a variable flap or slide.

With the arrangement in accordance with the principles of the invention which attain resistance increase, such device is situated at a location with a significantly lower temperature so that the useful life is increased under conditions which are otherwise identical with devices heretofore available.

A further advantage is obtained in that turbulence generating installations are avoided in the area between the kiln intake and the suspension type heat exchanger whereby the inclination to form dust circulations and injurious deposits is avoided.

A further feature of the invention is that with the provision of a variable choke member, an extremely precise and uniform control of the amount of combustion air is achieved by means of balancing secondary air and tertiary air whereby temperature transgressions and irregularities in clinker burning are avoided.

A further feature of the invention is the attainment of a reduction of temperature achieved by means of creating better flow relationships in the intake chamber whereby undesired material solidifications and cakings are avoided.

In accordance with the invention, a vertical shaft or conduit between the rotary kiln and the cooler branches into two separate channels with one connecting the cooler to the rotary kiln, and the other connecting the cooler to the tertiary air conduit with a device for increasing the resistance of gas flow being disposed in the passage between the cooler and rotary kiln.

With the foregoing arrangement, the advantage is obtained in that the conduit which connects the cooler to the tubular kiln can be constructed of a relatively narrow cross-section so that the variable constriction, such as a throttle member which is disposed at this location can be positioned without coming into contact with the heated descending clinker and yet can achieve a significantly high flow resistance in order to exercize the intended throttle effect.

It is a feature of the invention that the throttle member be designed as an adjustable sliding plate which is operated with a motor drive. A further throttle member can also be disposed in the branch of the conduit leading between the cooler and the tertiary air conduit.

In order to reduce the amount of dust arising in the cooler before the entry of the air leaving the cooler and flowing into the tertiary air conduit, a channel is located which is designed as a dust separator and is equipped with a flow guide member inducing a turbulent flow around the mouth of the tertiary air conduit.

A further feature of the invention is that one wall of the channel connecting the tubular kiln and cooler is offset in the direction of the movement of the lower side of the tubular kiln, being offset relative to a vertical plane extending through the axis of rotation of the tubular kiln and extending through the constricted cross-sectional area which increases flow resistance from the cooler to the kiln. The sliding throttle plate is expediently located in this constricted cross-sectional area.

An advantage which derives from this throttle member and its location is that the conduit constriction is increased by the throttle member and the design of the walls is such that the descending heated clinker cannot contact or damage either the walls or the throttle members.

Other objects, advantages and features will become more apparent as will equivalent structures and methods which are intended to be covered herein, with the teaching of the principles of the invention in connection with the disclosure of the preferred embodiments thereof in the specification, claims and drawings, in which:

DESCRIPTION OF THE PREFERRED EMBODIMENT

Figure 1:
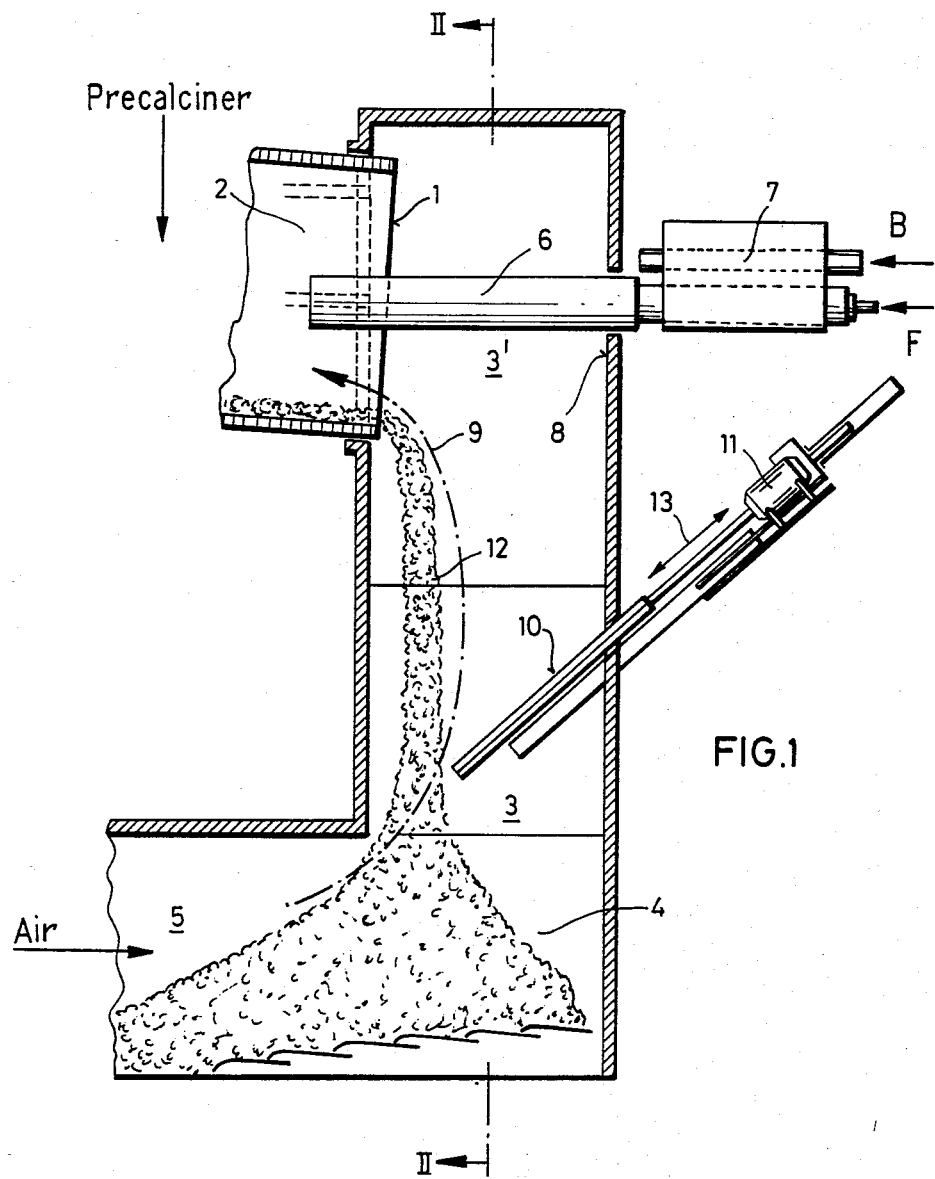
FIG. 1 is a vertical sectional view taken substantially through the axis of the rotary kiln and substantially along line E—E of FIG. 2.

FIG. 1 illustrates the location for the clinker discharge from the discharge end 1 of a rotary tubular kiln 2 which is shortened for convenience of illustration. The kiln receives material from a suspended precalciner or deacidifier such as the cyclone type which is supplied with heated air and precalcines the ground rock to deliver it to the lead end of the rotary kiln.

The discharge end 1 of the rotary kiln projects into a vertical conduit or shaft 3 which it leads downwardly to the intake area 4 of a cooler 5.

Heat for the kiln is derived from a burner 7 which is disposed at the discharge end 1 of the kiln and has a guard tube 6 which projects through a wall area 8 of the vertical conduit 3.

The burner 7 is supplied with primary air by a blower shown schematically by the arrowed line B and is supplied with fuel from a fuel supply means shown schematically by the arrowed line F. The function of the burner is to process the air and fuel into a combustible mixture and to inject this into the firing zone of the rotary tubular kiln 2.

The tubular kiln 2 receives the secondary air required for the development and complete burn-out of the flame from the burner. The secondary air is received from the hot exhaust gas of the cooler 5 with the flow indicated by the broken arrowed line 9. The vertical conduit 3 has a constricted area 24, FIG. 2, and disposed in this constricted area is a throttle member or plate 10 which is equipped with a drive motor 11. The sliding plate is disposed in the wall area 8 of the vertical conduit 3 opposite the location of the rotary tubular kiln, that is, opposite its discharge end 1, and the plate 10 extends through a slot situated in the wall 8. In order to prevent the descending hot clinker 12 from striking the sliding plate, it is positioned so that its upper surface slopes in a downward direction. In this position care is taken so that the descending clinker 12 falls past the slide plate 10 without striking or damaging it, and any clinker such as lightweight particles which fall onto the plate 10 will slide off of it to drop downwardly into the cooler 5.

Figure 2:
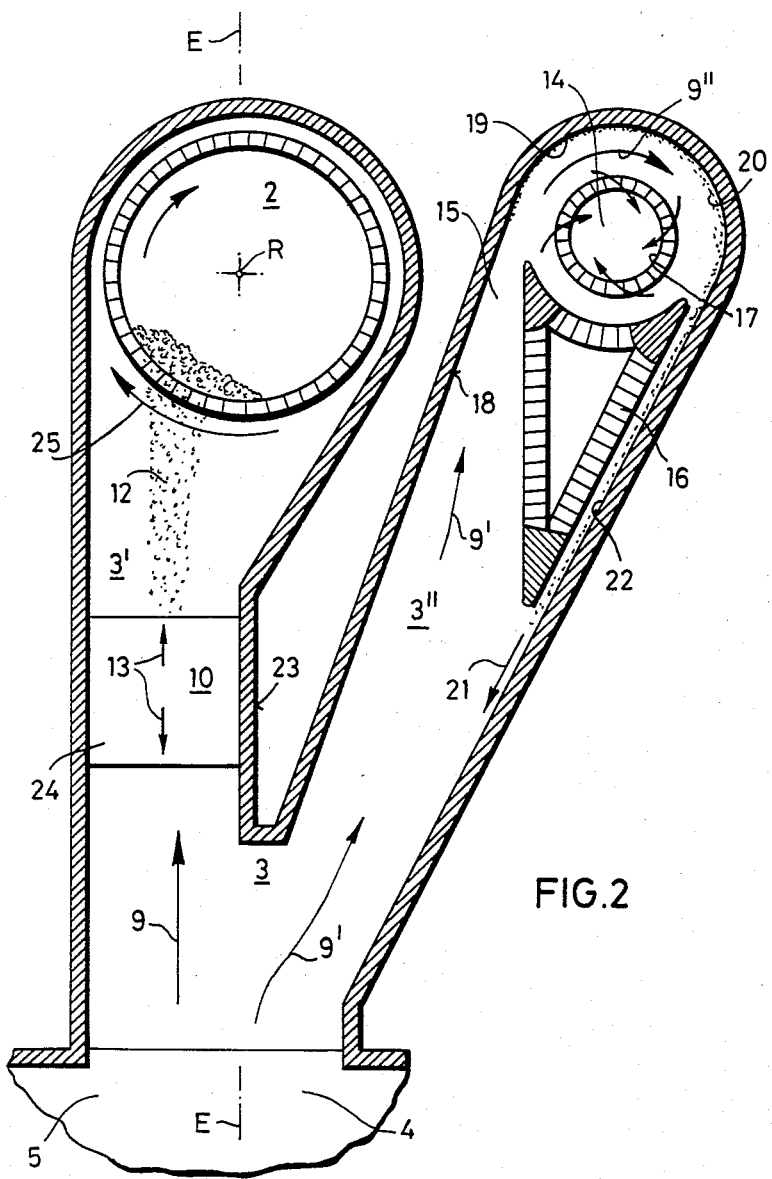
FIG. 2 is a vertical sectional view taken substantially along a plane perpendicular to the section plane of FIG. 1 and extending substantially along the section line II—II of FIG. 1.

As illustrated in FIG. 2, the conduit 3 is provided with a branch so that it has a main channel or passage 3' and a branch passage or channel 3''. The main passage or conduit 3' connects the cooler 5 to the rotary kiln 2. The throttle member slide plate 10 is positioned in the conduit 3'. As shown in FIG. 2, one wall 23 of the channel 3' is offset in the direction of the movement of the lower side of the rotary kiln as indicated by the arrowed line 25. The wall 23 is set back or offset from a vertical plane E—E which extends through the axis of rotation R of the rotary kiln 2 to thus form the constricted cross-sectional area 24.

The sliding plate 10 is disposed in this constricted cross-sectional area 24 which, because of the constriction by itself, produces a noticeable increase of flow resistance of the exhaust air rising from the cooler. Thus, the sliding plate 10 provides a controllable increase in the resistance of gas flow through the constricted area 24. The position of the plate is such that the clinker falls past its lower end and is not impeded in the drop from the discharge end of the kiln to the cooler.

The constriction of the cross-section in the area 24 also has the advantage that an increased velocity of secondary air prevails at this location so that the stream of descending clinker 12 encounters a preliminary cooling to the high velocity air flow.

The effect of the slide valve plate 10 disposed in the shaft between the cooler 5 and the kiln 2 and operated by the motor 11 will be observed from FIGS. 1 and 2. As a result of a greater or lesser depth of insertion, that is, movement of the plate further or less into the constriction 24, as indicated by the double arrow 13, the flow cross-section of the channel 3' is more or less constricted and thereby the intended throttle effect is achieved to a controlled degree. Due to the rise of the resistance at this location, a higher pressure differential is available for the tertiary air conduit 14 over its length. Consequently, the provided equalization between the flow systems of the rotary tubular kiln 2 and tertiary air conduit 14 is achieved while avoiding the disadvantages existing in prior art structures. In particular, the course of the flow in the area between the rotary tubular kiln and the suspension type heat exchanger or precalciner is not disturbed so that the ground rock can flow rapidly or shoot in unimpeded at this location avoiding caking. At the same time, temperatures at this location are somewhat lowered being advantageous particularly when short rotary tubular kilns are used.

Moreover, the throttle member or slide plate 10 is situated in a temperature area of maximum temperatures ranging from 650° through 850° C. Accordingly, this is a temperature area lower by several hundred degrees than throttle members used in structures heretofore available, and this attains a considerable advantage as to the useful operating life of the throttle valve and its continued satisfactory functioning.

FIG. 2 shows a section through the shaft 3 along the section line II—II of FIG. 1, in a plane perpendicular to the axis of the rotary tubular kiln. FIG. 2 shows the shaft 3 formed in its main passage 3' and the branch passage 3''. The main passage 3' provides the connection between the cooler 5 and the rotary tubular kiln 2 and the branch passage 3'' produces the connection the between cooler 5 and the tertiary air conduit 14. In the description, identical parts are provided with similar reference numerals.

The illustration of FIG. 2 shows the branching of the air streams affected by the branching off of the main passage 3' into the branch passage 3''. The stream of secondary air flows according to the arrow 9 and the flow of tertiary air is indicated by the arrowed line 9'.

A flow guide element 16 is located in the branch passage 3'' and is constructed so as to force the flow 9' of tertiary air into a turbulent flow 9'' around the mouth 17 which is built into the upper area 15 of the branch passage 3''. As a result of this design, the upper area 15 of the passage 3'' acts as a dust separator. In the upper area 15 the flow 9' is accelerated between the flow guide member 16 and the wall area 18 as a result of the increasingly narrow constriction of the flow cross-section. The gas flow then flows at a relatively high speed into the circular deflection area 19. Therefore, under the influence of centrifugal force, dust particles 20 are separated from the gas and impacted against the wall 19, and the dust flow passes down along the wall area 22 of the channel 3'' and down into the intake area 4 of the cooler 5.

In operation calcining or burning of the cement rock occurs in the rotary kiln 2, and the clinker drops down from the discharge end 1 in a stream 12 down to the cooler 5, FIG. 2. Cooler air, forced through the cooler by a blower, not shown, flows upwardly through the conduit 3 and resistance to flow is controlled by the position of the flat slide valve 10 so that a limited amount of secondary air flows up into the discharge end of the kiln. The air flow from the cooler is split so that the remaining portion flows in accordance with the arrowed lines 9' up through the branch passage 3'' into the tertiary air conduit 14. The air first is forced into a centrifugal circulating motion to discharge its dust along the wall for the dust to slide down back to the cooler 5, and the tertiary air flows through the tertiary air passage to the precalciner.

Thus, it will be seen that I have provided an improved method and apparatus which meets the objectives and advantages above set forth and provides for reliable control of the air supply to a cement calcining apparatus.

I claim as my invention:

1. In a cement making mechanism, the combination comprising:
    a rotary tubular kiln,
    means for introducing precalcined raw meal to said kiln,
    a cooler disposed vertically below the discharge end of said kiln to catch calcined material falling from said kiln,
    a vertical conduit connecting the discharge end of said kiln with the inlet end of said cooler, said conduit providing free fluid communication between said cooler and said discharge end of said kiln whereby air from said cooler passes through said conduit and into said discharge end, said conduit above said cooler being divided into two branches including a first branch leading to said discharge end of said kiln, said first branch including wall means narrowing said first branch above said cooler and providing a flow constriction for air passing from said cooler to said discharge end of said kiln,
    an adjustable flow restricting means positioned in said first branch for adjustably throttling flow of air between said kiln and said cooler, while permitting the free fall of solid calcined material from said kiln to said cooler,
    a tertiary air conduit located in the second branch of said conduit, and
    a flow guide element positioned below said tertiary conduit in said second branch and being configured to force the flow of air rising from said cooler into a turbulent flow about said tertiary air conduit resulting in a centrifugal action on particles suspended in the air stream to deposit said particles in said second branch beyond said tertiary air conduit.

2. In a mechanism for calcining cement constructed in accordance with claim 1:
    wherein said flow restricting means is in the form of an adjustable reciprocating slide with power means for adjustably moving said slide laterally into the conduit so that the resistance to gas flow is controlled as a function of the position of the slide.

3. In a mechanism for calcining cement constructed in accordance with claim 1:
    wherein said first branch is vertical and wherein said second branch is at an angle thereto inclined upwardly at an angle to a vertical plane passing through the axis of rotation of the rotary kiln in the direction of the oncoming movement of the lower portion of the kiln.

* * * * *